United States Patent
Hartsock et al.

(10) Patent No.: US 10,374,898 B2
(45) Date of Patent: Aug. 6, 2019

(54) NETWORK REVISION EVALUATOR

(71) Applicant: The Boeing Company, Chicago, IL (US)

(72) Inventors: Jason Hartsock, Bethalto, IL (US); Noah Lev Pritikin, Anaheim Hills, CA (US); Kevin J. Stalzer, Charleston, SC (US)

(73) Assignee: The Boeing Company, Chicago, IL (US)

( * ) Notice: Subject to any disclaimer, the term of this patent is extended or adjusted under 35 U.S.C. 154(b) by 968 days.

(21) Appl. No.: 14/261,378

(22) Filed: Apr. 24, 2014

(65) Prior Publication Data

US 2015/0312099 A1 Oct. 29, 2015

(51) Int. Cl.
| | |
|---|---|
| H04L 12/24 | (2006.01) |
| G06F 8/60 | (2018.01) |
| G06F 8/654 | (2018.01) |
| G06F 8/65 | (2018.01) |

(52) U.S. Cl.
CPC ............ *H04L 41/0893* (2013.01); *G06F 8/60* (2013.01); *G06F 8/65* (2013.01); *G06F 8/654* (2018.02); *H04L 41/082* (2013.01); *H04L 41/0816* (2013.01); *H04L 41/0859* (2013.01)

(58) Field of Classification Search
CPC ............... H04L 41/082; H04L 41/0859; H04L 41/0893; H04L 41/0813; H04L 41/12; H04L 67/303; H04L 67/34
See application file for complete search history.

(56) References Cited

U.S. PATENT DOCUMENTS

| | | |
|---|---|---|
| 6,321,229 B1 | 11/2001 | Goldman et al. |
| 7,027,411 B1 | 4/2006 | Pulsipher et al. |
| 7,392,300 B2 | 6/2008 | Anantharangachar et al. |
| 7,890,802 B2 | 2/2011 | Gerber |
| 7,925,666 B1 | 4/2011 | Johnson et al. |

(Continued)

FOREIGN PATENT DOCUMENTS

| | | |
|---|---|---|
| GB | 2509635 A | 7/2014 |
| WO | 2012105980 A1 | 8/2012 |
| WO | 2013051142 A1 | 4/2013 |

OTHER PUBLICATIONS

United Kingdom Intellectual Property Office, Combined Search and Examination Report under Sections 17 and 18(3) regarding United Kingdom Patent Application No. GB1507022.0, dated Oct. 22, 2015, 9 pages.

(Continued)

*Primary Examiner* — Barbara B Anyan
(74) *Attorney, Agent, or Firm* — Kolisch Hartwell, P.C.

(57) ABSTRACT

A process may include a step of receiving a request to perform a revision on plural network devices. The process may include a step of identifying at least a first group of the plural network devices according to a first predetermined criterion including at least a first feature with a same first predefined characteristic. The process may include a step of determining whether the requested revision can be successfully performed on network devices in the first group of the plural network devices. The process may include a step of storing on an electronic storage device a record of whether the requested revision can be successfully performed on the network devices in the first group of the plural network devices.

10 Claims, 7 Drawing Sheets

(56) References Cited

U.S. PATENT DOCUMENTS

| | | | |
|---|---|---|---|
| 8,010,952 B2 | 8/2011 | Datla et al. | |
| 8,468,231 B1 | 6/2013 | Vance | |
| 8,555,273 B1 * | 10/2013 | Chia | G06F 8/654 |
| | | | 717/173 |
| 8,782,632 B1 * | 7/2014 | Chigurapati | G06F 8/65 |
| | | | 717/172 |
| 8,943,490 B1 * | 1/2015 | Jain | H04Q 3/54516 |
| | | | 717/168 |
| 9,229,902 B1 * | 1/2016 | Leis | H04L 41/082 |
| 9,575,738 B1 * | 2/2017 | Chopra | G06F 8/60 |
| 2004/0167906 A1 | 8/2004 | Smith et al. | |
| 2007/0240151 A1 | 10/2007 | Marl et al. | |
| 2012/0016951 A1 * | 1/2012 | Li | H04N 21/6125 |
| | | | 709/217 |
| 2012/0110150 A1 * | 5/2012 | Kosuru | H04L 41/082 |
| | | | 709/221 |
| 2015/0067113 A1 * | 3/2015 | Dankwardt | H04L 41/0816 |
| | | | 709/221 |
| 2015/0178064 A1 * | 6/2015 | Cairns | G06F 8/65 |
| | | | 717/171 |

OTHER PUBLICATIONS

Hewlett-Packard Development Company, L.P., "HP Network Automation software: Data sheet" dated Mar. 2, 2009, 2 pages.

\* cited by examiner

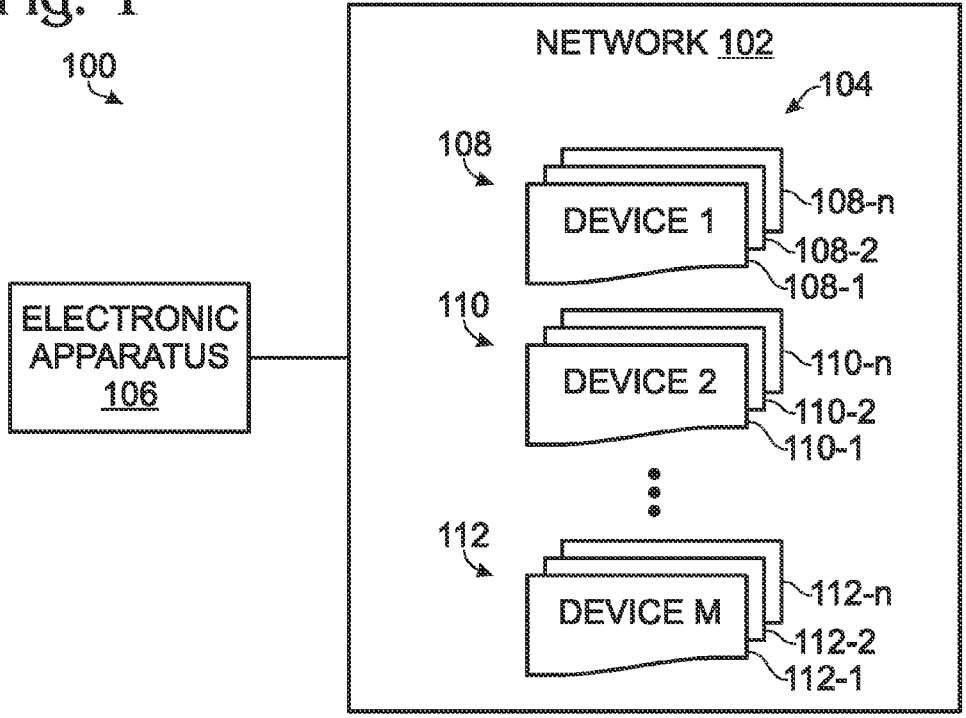
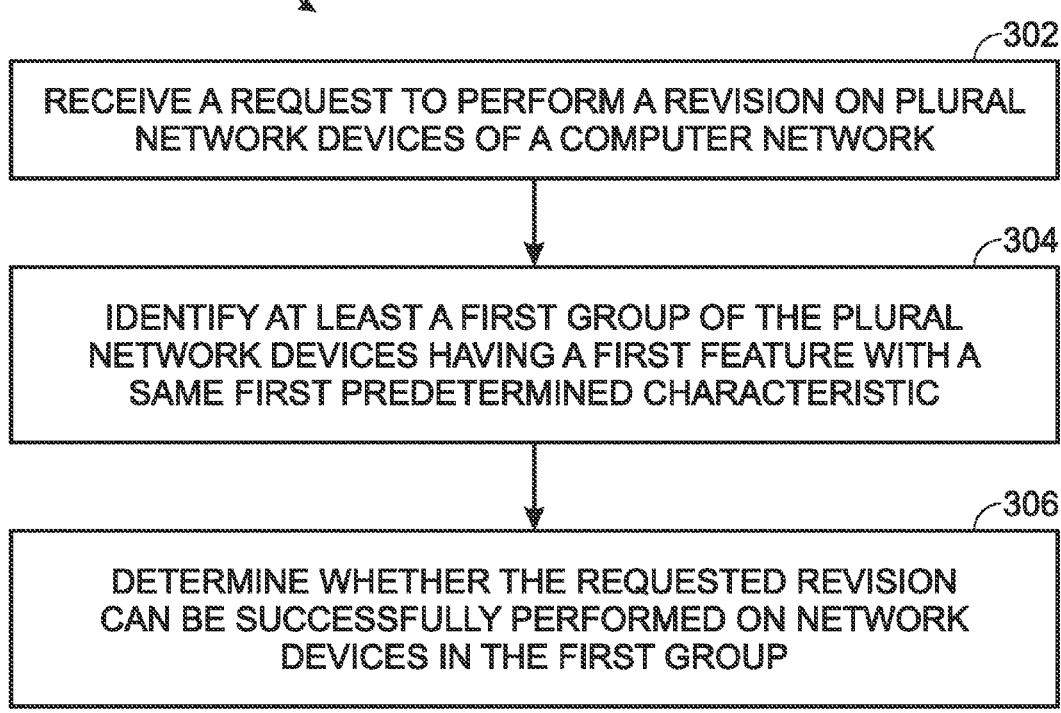

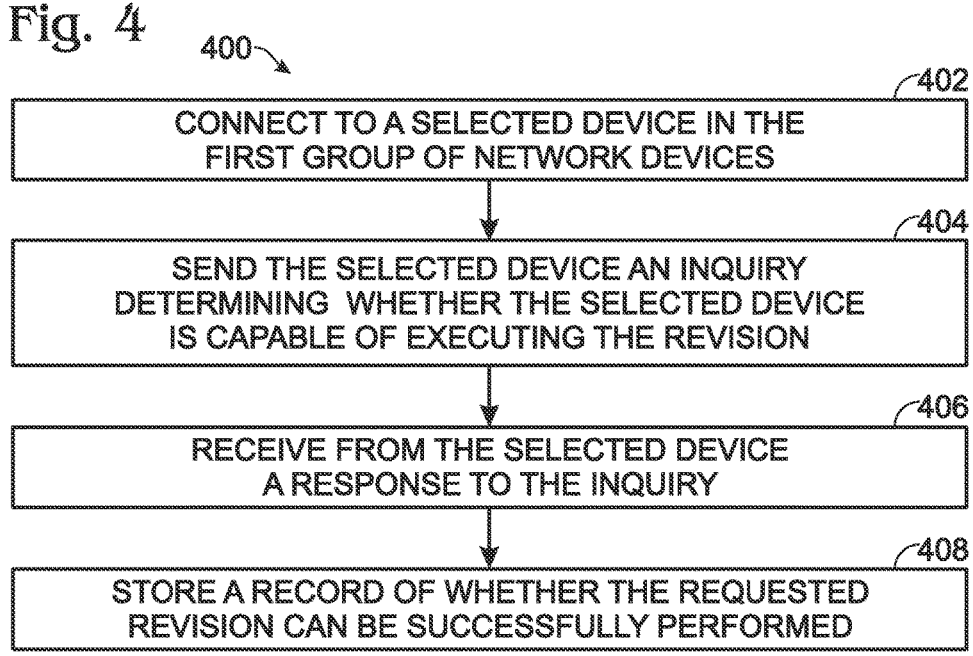
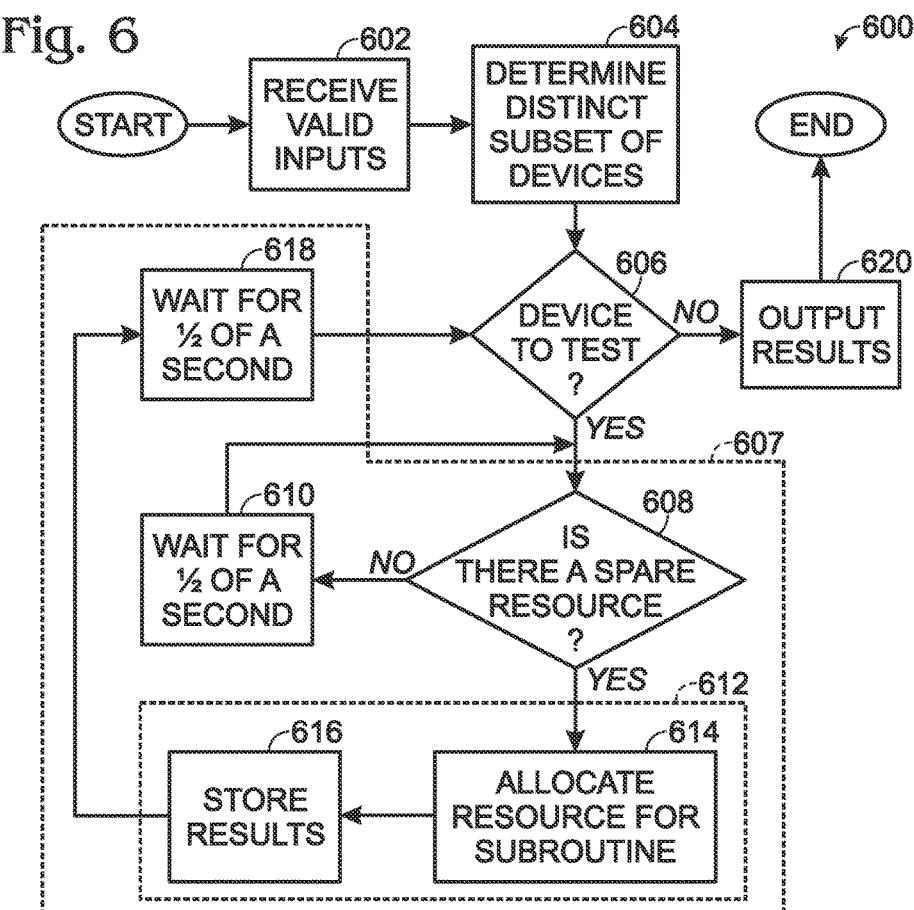

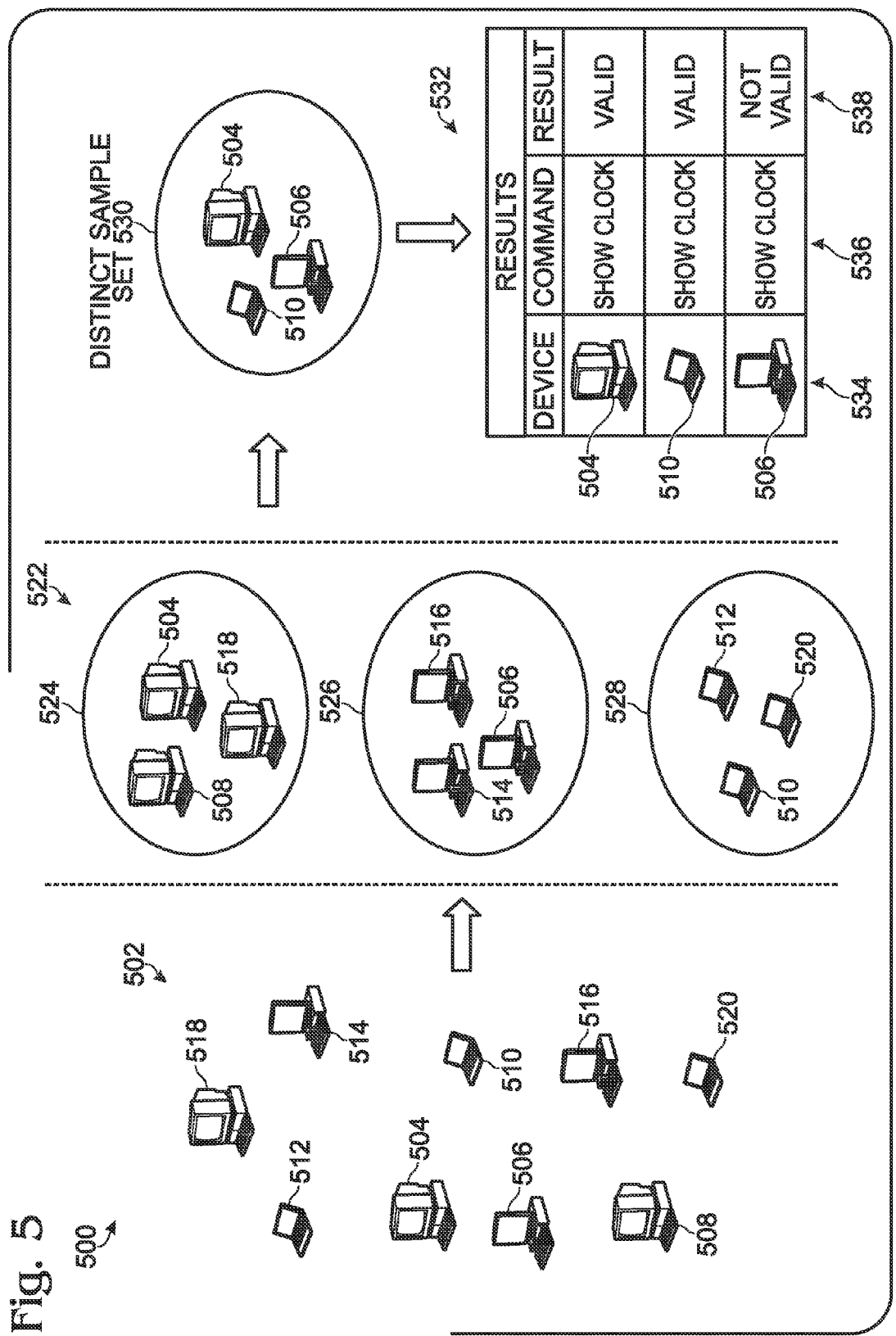

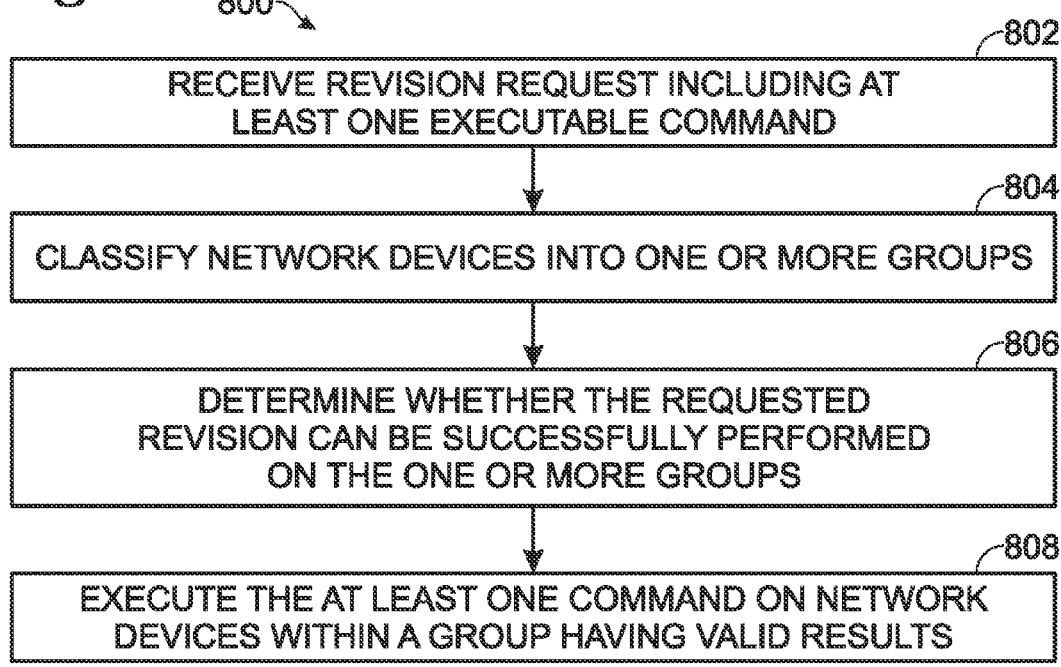

NETWORK REVISION EVALUATOR

FIELD

This invention relates to information technology, and more specifically to systems and methods for evaluating the application of a requested network revision.

BACKGROUND

Typically, a computer network may include a large number and variety of network devices. Generally, each of these network device has one or more features, such as a device type (e.g., router, switch, client computer, electronic storage device, network-enabled drill, etc.), and/or device function (e.g., storage, computing, user login, security, etc.). Each of these features may have one or more predefined characteristics, such as device model number, software version, operating system, supervisor module, and/or voltage.

On occasion, it may be desirable to revise the computer network. For example, an architecture group of information technology professionals may identify a revision that could be made to the computer network, such as an improvement to network login manner, network security, and/or network efficiency, a reconfiguration, a software update, or a hardware update. The architecture group, or other group, such as a group of network designers, may then develop a set of commands (e.g., computer program code) that they believe would effect the desired network revision when executed on the network devices. However, commands that run on one device may not work the same way, or at all, on another device, for example, due to variations of the features of those devices and/or variations of the predefined characteristics of those features. Revisions are successfully deployed when they are compatible with each particular device.

SUMMARY

Disclosed herein are various embodiments of systems and methods that may be used to group network devices according to their predefined characteristics, which may streamline device analysis and application of a requested network revision.

An exemplary method may comprise a step of receiving a request to perform a revision on plural network devices, with at least some of the plural network devices having at least a first feature with plural predefined characteristics. The exemplary method may comprise a step of identifying at least a first group of the plural network devices according to a first predetermined criterion including the at least a first feature with the same first predetermined characteristic. The exemplary method may comprise a step of determining whether the requested revision can be successfully performed on network devices in the first group of the plural network devices. The exemplary method may comprise a step of storing a record of whether the requested revision can be successfully performed on network devices in the first group of the plural network devices. The record may be stored on an electronic storage device.

Another exemplary method may comprise a step of receiving a request to perform a revision on plural network devices, with at least some of the plural network devices having at least a first feature with plural predefined characteristics. The exemplary method may comprise a step of identifying at least a first group of the plural network devices according to a first predetermined criterion including the at least a first feature with the same first predetermined characteristic. The exemplary method may comprise a step of determining by the electronic apparatus whether the requested revision can be successfully performed on network devices in the first group of the plural network devices without performing the revision on a network device in the first group of the plural network devices.

The present disclosure provides various systems and methods. In some embodiments, the electronic apparatus may select one of the network devices in the first group of the plural network devices. In some embodiments, the electronic apparatus may connect to the selected one network device, and send the selected one network device an inquiry determining whether the selected one network device is capable of executing the revision. In some embodiments, prior to sending the inquiry, at least a first command that it is desired to execute on the selected one network device may be formatted in a format that may prevent the selected one network device from executing the at least first command upon receipt of the inquiry. In some embodiments, the electronic apparatus may receive a response to the inquiry indicating whether the selected one network device is capable of executing the revision. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a schematic diagram of an illustrative network data processing system.

FIG. 3 is a flowchart illustrating an exemplary method.

FIG. 4 is a flowchart illustrating another exemplary method.

FIG. 5 is a diagram illustrating an example of a method.

FIG. 6 is an illustration of operations performed by one embodiment.

FIG. 8 is a flowchart illustrating another example of a method.

DESCRIPTION

Overview

Figure 2:
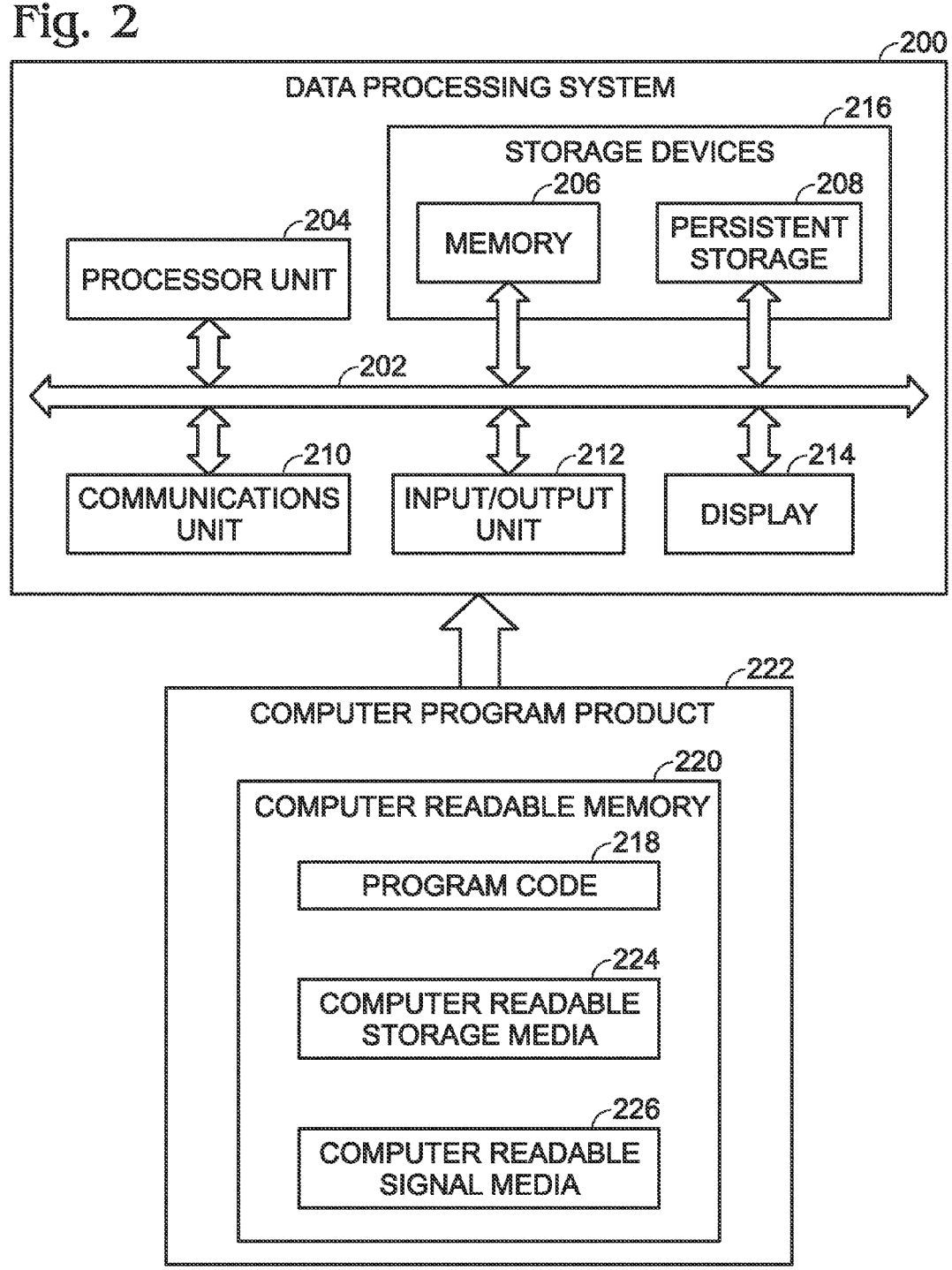
FIG. 2 is a schematic diagram of an illustrative data processing system.

Various embodiments of systems and methods for evaluating a requested network revision are described below and illustrated in the associated drawings. Unless otherwise specified, a system or method and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with a system or method may, but are not required to, be included in other similar systems or methods. The following description of various embodiments is merely exemplary in nature and is in no way intended to limit the invention, its application or uses. Additionally, the advantages provided by the embodiments, as described below, are illustrative in nature and not all embodiments provide the same advantages or the same degree of advantages.

Systems and methods for evaluating a requested network revision may be generally described as one or more systems, processes, or computer program products implemented by an electronic apparatus, such as a computer system. One or more groups of distinct network devices may be identified in response to a received request to perform a revision on network devices of a computer network. In one example, a computer-implemented process may include determining by the electronic apparatus whether the requested revision can be successfully performed on network devices in a first group of network devices. As mentioned above, the revision may include, without limitation, a device reconfiguration and/or a software update. An example of a device reconfiguration may be a selection of an existing device functionality (e.g., showing a clock, or setting or modifying an elapsed time after which an inactive device goes to "sleep"). An example of a software update may be a change or replacement of device software to modify existing device functionality (e.g., updating a device operating system from a first version to a second version that is different than the first version).

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

SPECIFIC EXAMPLES, MAJOR COMPONENTS, AND ALTERNATIVES

Example 1

This example describes a network data processing system 100 in which illustrative embodiments may be implemented; see FIGS. 1 and 2. It should be appreciated that FIG. 1 is provided as an illustration of one implementation and is not intended to imply any limitation with regard to environments in which different embodiments may be implemented. Many modifications to the depicted environment may be made.

In this example, system 100 may include a network (or computer network) 102. Network 102 may include (or be connected to) plural network devices 104. System 100 may include an electronic apparatus 106. Electronic apparatus 106 may have access to network devices 104. For example, network 102 may include media used to provide one or more connections between electronic apparatus 106 and network devices 104. The one or more connections may be made with wire, wireless communication links, fiber optic cables, and/or any other suitable medium for transmitting and/or communicating data between network devices.

Exemplary network devices 104 may include, without limitation, one or more routers, one or more switches, one or more voice gates, one or more servers, one or more clients of the one or more servers, one or more electronic storage devices, one or more imaging devices, and/or one or more networked-enabled tools that may perform a mechanical or other function. These network devices may be interconnected through wired, wireless, optical, and other appropriate communication links. The clients may include, without limitation, personal computers, network computers, or smart phones. The imaging devices may include printers, scanners, copiers, facsimile machines, and/or other suitable imaging devices. The servers may provide information, such as boot files, operating system images, and applications to the clients.

Program code located in system 100 may be stored on a computer readable storage medium and downloaded to a data processing system or other device for use, as is discussed in more detail with reference to a computer system illustrated in FIG. 2. For example, program code may be stored on a computer readable storage medium of the one or more servers and downloaded to electronic apparatus 106 over network 102.

Network 102 may include the Internet or a world-wide connection of networks and gateways that use the Transmission Control Protocol/Internet Protocol (TCP/IP) suite of protocols to communicate with one another. At the heart of the Internet is a backbone of high-speed data communication lines between major nodes of host computers, including commercial, governmental, educational, and other computer systems that route data and messages. Of course, network 102 may be implemented as a number of different networks, such as an intranet, a local area network (LAN), or a wide area network (WAN). FIG. 1 is intended as an example, and not as an architectural limitation for the different illustrative embodiments.

Network devices 104 may include one or more devices 108, such as devices 108-1, 108-2, 108-n, one or more devices 110, such as devices 110-1, 110-2, 110-n, and/or one or more devices 112, such as devices 112-1, 112-2, 112-n. Devices 108 may be devices of a first type, such as client computers. Devices 110 may be devices of a second type, such as electronic storage devices. Devices 112 may be devices of a third type, such as routers.

At least some of network devices 104 may have at least a first feature with plural predefined characteristics. For example, devices 108 may each have a computing feature, but the computing features of devices 108-1, 108-2 may each have a predefined characteristic that is different than a predefined characteristic of the computing feature of device 108-n. For example, the predefined characteristic of the computing features of devices 108 may be an operating system, with different devices in group 108 of devices having different operating systems. For example, devices 108-1, 108-2 may each have a first operating system (e.g., a WINDOWS® operating system), and device 108-n may have a second operating system (e.g., a MACINTOSH® operating system) that is different than the first operating system. In this example, group 108 of network devices have the common feature that they are all client computers and also have the common feature that they have operating systems. The feature "client computers" may have different characteristics, such as the make and model of computer that may be different among the group. Further, the feature "operating system" may have different characteristics within the group, such as type of operating system or version of operating system.

Different types of devices may have the same feature, but some of the same features may have different characteristics. For example, devices 108, 110, 112 may each have a power supply feature. However, the power supply feature of devices 108, 110 may have a predefined characteristic corresponding to a first voltage, and the power supply feature of devices 112 may have a predefined characteristic corresponding to a second voltage that is different than the first voltage. It will be appreciated, then that a portion or all of network devices 104 may be grouped in different groups based on predetermined criterion including, for example, the features and characteristics of those features. As a further example, groups 108, 110, and 112 may be all devices in network devices 104 that have the same combination of features, such as category of device, make of device, model of device, software version operating on the device, or other features considered relevant (e.g., related) to a particular revision that may be determined for devices on the network. Group 108 may consist of those devices having a first combination of characteristics of those features. Group 110 may consist of those devices having a second combination of characteristics of those features. Group 112 may consist of those devices having an n-th combination of characteristics of those features. In this example, all of the devices within each group then has a unique combination of feature characteristics, with each group having a different combination of feature characteristics. Grouping can then be based on the characteristics of a single feature or can be based on combinations of plural features having different respective features.

FIG. 2 shows a data processing system 200 in which illustrative embodiments may be implemented. Data processing system 200 is an illustrative data processing system that may be, or may be included in, any one of network devices 104 and/or electronic apparatus 106 described with reference to FIG. 1.

Data processing system 200 may include a communications framework 202. Communications framework 202 may provide communications between a processor unit 204, a memory 206, a persistent storage 208, a communications unit 210, an input/output (I/O) unit 212, and a display 214. In different examples, a network device 104 or an electronic apparatus 106 may include more or fewer components than those illustrated. Memory 206, persistent storage 208, communications unit 210, input/output (I/O) unit 212, and display 214 are examples of resources accessible by processor unit 204 via communications framework 202.

Processor unit 204 may run instructions for software that may be loaded into memory 206, from a storage device, such as persistent storage 208. Processor unit 204 may be a number of processors, a multi-processor core, or some other type of processor, depending on the particular implementation. Further, processor unit 204 may be implemented using a number of heterogeneous processor systems in which a main processor may be present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and other suitable information either on a temporary basis or a permanent basis.

Storage devices 216 also may be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 or the device the storage media is contained in also may be removable. For example, a removable optical disk or removable flash drive may be used for computer readable storage media, or a removable hard drive may be used for persistent storage 208.

Communications unit 210, in these examples, may provide for communications with other data processing systems or devices. In these examples, communications unit 210 may be a network interface card. Communications unit 210 may provide communications through the use of either or both physical and wireless communications links.

Input/output (I/O) unit 212 may allow for input and output of data with other devices that may be connected to data processing system 200. For example, input/output (I/O) unit 212 may provide a connection for user input through a keyboard, a mouse, and/or some other suitable input device. Further, input/output (I/O) unit 212 may send output to a printer. Display 214 may provide a mechanism to display information to a user.

Instructions for the operating system, applications, and/or programs may be located in storage devices 216, which may be in communication with processor unit 204 through communications framework 202. In these illustrative examples, the instructions may be in a functional form on persistent storage 208. These instructions may be loaded into memory 206 for execution by processor unit 204. The processes of the different embodiments may be performed by processor unit 204 using computer-implemented instructions, which may be located in a memory, such as memory 206, or transferred to a memory from a persistent storage device.

These instructions may be referred to as program instructions, program code, computer usable program code, or computer readable program code that may be read and executed by a processor in processor unit 204. The program code in the different embodiments may be embodied on different physical or computer readable storage media, such as memory 206 or media of persistent storage 208.

Program code 218 may be located in a functional form on computer readable media 220 that is selectively removable and may be loaded onto or transferred to data processing system 200 for execution by processor unit 204. Program code 218 and computer readable media 220 may form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage device containing storage media, such as a hard drive, a thumb drive, or a flash memory, that is connected to data processing system 200. In some instances, computer readable storage media 224 may not be removable from data processing system 200.

In these examples, computer readable storage media 224 may be a physical or tangible storage device used to store program code 218 rather than a medium that propagates or transmits program code 218. Computer readable storage media 224 may be also referred to as a computer readable tangible storage device or a computer readable physical storage device. In other words, computer readable storage media 224 may be a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, a voltage signal, and/or any other suitable type of signal. These signals may be transmitted over communications links, such as wireless communications links, optical fiber cable, coaxial cable, a wire, and/or any other suitable type of communications link. In other words, the communications link and/or the connection may be a physical structure or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to and/or in place of those illustrated for data processing system 200. Other components shown in FIG. 2 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use, such as firmware. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 218 may be omitted, because the processes for the different embodiments may be implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, communications unit 210 may include a number of devices that transmit data, receive data, or both transmit and receive data. Communications unit 210 may be, for example, a modem or a network adapter, two network adapters, or some combination thereof. Further, a memory may be, for example, memory 206, or a cache, such as that found in an interface and memory controller hub that may be present in communications framework 202.

Example 2

FIG. 3 is a flowchart illustrating steps that may be performed in an illustrative method by an electronic apparatus, such as electronic apparatus 106, and may not recite the complete process or all steps of an associated program. FIG. 3 depicts multiple steps of a method, generally indicated at 300, which may be performed in conjunction with any of the suitable examples disclosed herein. Although various steps of method 300 are described below and depicted in FIG. 3, the steps need not necessarily all be performed, and in some cases may be performed in a different order than the order shown.

Method 300 may include a step 302 of receiving a request by electronic apparatus 106 to perform a revision on plural network devices 104 of computer network 102 to which the electronic apparatus has access. At least some of the plural network devices 104 may have at least a first feature with plural predefined characteristics.

At a step 304, at least a first group of the plural network devices may be identified according to a first predetermined criterion. The first predetermined criterion may include the at least first feature with a same first predefined characteristic. For example, if the revision relates to the power supply feature, then electronic apparatus 106 may identify a first group as including devices 108, 110, but not devices 112.

A determination may then be made in a step 306 by the electronic apparatus whether the requested revision can be successfully performed on network devices in the first group of network devices.

FIG. 4 shows one or more additional steps, generally indicated at 400, which may be included in method 300. For example, step 306 of method 300 may include steps 402, 404, and/or 406, and or method 300 may include a step 408.

An electronic apparatus performing these steps may connect, in step 402, to a selected device in the first group of network devices. Electronic apparatus 106 may, for example, select one of the devices in the first group. In the case of a requested power supply feature revision, electronic apparatus 106 may select device 110-1 from the first group and may connect to device 110-1 on network 102. Electronic apparatus 106 may send, in step 404, an inquiry to device 110-1 to determine whether device 110-1 is capable of executing the requested revision. In some embodiments, the determination at step 306 may be made without performing the revision on a network device (or any of the network devices) in the first group of network devices. For example, the inquiry of step 404 may not require the selected device to perform the revision.

In step 406, electronic apparatus 106 may receive a response to the inquiry from device 110-1. The response may indicate whether device 110-1 is capable of executing the requested revision.

In some examples, method 300 may further include step 408 of storing on an electronic storage device a record of whether the requested revision can be successfully performed on the network devices in the first group of network devices (e.g., devices 108 and 110). The record may be based on whether it was determined that the requested revision can be successfully performed on the selected one device (e.g., device 110-1).

In some embodiments, method 300 may further include, prior to sending device 110-1 an inquiry determining whether the selected one device is capable of executing the revision, electronic apparatus 106 may format at least a first command of the inquiry in a format that may prevent device 110-1 from executing the at least first command upon receipt of the inquiry by device 110-1. The at least first command may correspond to a command that may be executable to perform the requested revision.

In some embodiments, method 300 may further include identifying at least a second subgroup (or group) of network devices on network 102 having the first feature with a same second predefined characteristic related to the revision. The second predefined characteristic may be different than the first predefined characteristic. For example, the second group may be identified as including devices 112 (e.g., by electronic apparatus 106).

Method 300 may further include a step of determining by the electronic apparatus whether the requested revision can be successfully performed on network device in the second group. For example, electronic apparatus 106 may select device 112-2 from the second group, and may determine whether the requested power supply feature revision can be successfully performed on device 112-2. For example, electronic apparatus 106 may connect to device 112-2 on network 102. Electronic apparatus 106 may send an inquiry to device 112-2 to determine whether device 112-2 is capable of executing the requested revision. Electronic apparatus 106 may receive a response to the inquiry from device 112-2. The response may indicate whether device 112-2 is capable of executing the requested revision.

Prior to sending the inquiry to device 112-2, electronic apparatus 106 may format at least a first command of the inquiry in a format that may prevent device 112-2 from executing the at least first command upon receipt of the inquiry by device 112-2. The at least first command of the inquiry sent to device 112-2 may correspond to the at least first command of the inquiry sent to device 110-1. For example, these commands may be the same commands.

Method 300 may further include a step of storing on an electronic storage device a record of whether the requested revision can be successfully performed on network devices (e.g., devices 112) in the second group. The record may be based on whether it was determined that the requested revision can be successfully performed on the selected one network device (e.g., device 112-2) in the second group.

In some embodiments, method 300 may further include a step of assigning each of network devices 104 into one of a plurality of groups including the first group of network devices 104. Network devices 104 may have plural features including the first feature. Each of the plural features may have plural predefined characteristics among network devices 104. The plural predefined characteristics may include the first predetermined characteristic. Each group of network devices 104 may satisfy a respective predetermined criterion. The respective predetermined criterion may (each) include a unique combination of the predefined characteristics of the plural features. For example, if the revision relates to the power supply feature, then in addition to assigning devices 108, 110 to the first group, electronics apparatus 106 may assign devices 112 to the second group (or second subgroup) of or within plural network devices 104.

In some embodiments, method 300 may include determining by apparatus 106 whether the requested revision can be successfully performed on network devices in each of the plurality of groups of network devices.

In some embodiments, method 300 may include storing on an electronic storage device a record of whether the requested revision can be successfully performed on network devices in each of the plurality of groups of network devices.

In some embodiments, method 300 may include a step of, for each network device of network devices 104 having the first feature, determining whether the network device belongs to the first group. If the network device belongs to the first group, then method 300 may comprise a step of determining from the stored record whether the revision can be successfully performed on the first group, and/or a step of performing the revision on the network device if the record indicates the revision can be successfully performed on the first group.

Method 300 may include a step of selecting by the electronic apparatus one of the network devices in each of the plurality of groups. Method 300 may include a step of determining by the electronic apparatus whether the requested revision can be successfully performed on each of the selected one network devices in each of the plurality of groups. Method 300 may include a step of storing on an electronic storage device a record of whether the requested revision can be successfully performed on network devices in each of the plurality of groups based on whether it was determined that the requested revision can be successfully performed on the selected one network device in each of the plurality of groups.

In some embodiments, method 300 may include a step of, for each network device having the first feature, determining which group of the plurality of groups the network device belongs to, determining from the stored record whether the revision can be successfully performed on the group the network device belongs to, and/or performing the revision on the network device if the record indicates the revision can be successfully performed on the group the network device belongs to.

Electronic apparatus 106 may store a record of whether the requested revision can be successfully performed on network devices in each of the plurality of groups. The record may be stored on an electronic storage device. The record may be based on whether it was determined that the requested revision can be successfully performed on the selected network device in each of the plurality of groups.

For each network device having the first feature, electronic apparatus 106 may determine which group of the plurality of groups the network device belongs to, determine from the stored record whether the revision can be successfully performed on that group (e.g., the group the network device belongs to), and perform the revision on the network device if the record indicates the revision can be successfully performed on that group (e.g., the group the network device belongs to).

In some embodiments, method 300 may include a step of, for a selected network device in the first group of network devices, determining from the stored record whether the revision can be successfully performed on the first group of network devices, and performing the revision on the selected network device if the record indicates the revision can be successfully performed on the first group of network devices.

Similarly, for a selected network device in the second group of network devices, method 300 may include a step of determining from the stored record whether the revision can be successfully performed on the second group of network devices, and performing the revision on the selected network device if the record indicates the revision can be successfully performed on the second group of network devices.

In some embodiments, electronic apparatus 106 may refrain from performing the revision on the selected network device from the first group if the record indicates that the revision cannot be successfully performed on the first group of network devices.

Similarly, electronics apparatus 106 may refrain from performing the revision on the selected network device from the second group if the record indicates that the revision cannot be successfully performed on the second group of network devices.

Example 3

Basic steps discussed in the foregoing description may be illustrated graphically to facilitate an understanding of the process. This example describes illustrative operations, generally indicated at 500 in FIG. 5. In this example, an electronic apparatus, such as electronic apparatus 106 (see FIG. 1), may have access to plural network devices 502. Each of plural network devices 502 may include one or more features with one or more predefined characteristics. For example, plural network devices 502 may include devices 504, 506, 508, 510, 512, 514, 516, 518, 520, which are shown here as computing devices.

The electronic apparatus may receive a request to perform a revision (e.g., a device reconfiguration or a software update) on plural network devices 502. The revision may relate (or pertain) to a particular feature (or set of features) that may be included in all or a portion of devices 502, which features and characteristics may be used to define criteria for selecting devices for the revision.

At least some of plural network devices 502 may have at least the particular feature with different predefined characteristics. For example, the particular feature may be a computing feature. However, devices 502 may have differing predefined characteristics associated with the particular feature. For example, devices 504, 508, 518 may have a first predefined characteristic (or set of predefined characteristics), such as a first software version. Devices 506, 514, 516 may have a second predefined characteristic (or set of predefined characteristics), such as a second software version that is different than (or unique when compared to) the first software version. Devices 510, 512, 520 may have a third predefined characteristic (or set of predefined characteristics), such as a third software version that is different than (or unique when compared to) the first and second software versions.

In some embodiments, the electronic apparatus may assign (or classify) each of devices 502 having the particular feature into one or more groups 522 based on the uniqueness of the predefined characteristics of devices 502. For example, the electronic apparatus may assign devices 504, 508, 518 with the first predefined characteristic to a first group 524. The electronic apparatus may assign devices 506, 514, 516 with the second predefined characteristic to a second group 526. The electronic apparatus may assign devices 510, 512, 520 with the third predefined characteristic to a third group 528.

In some embodiments, the electronic apparatus may identify the respective groups as including the respective devices.

In some embodiments, the electronic apparatus may select one device from each of groups 522 to form a distinct sample set 530. Set 530 may be representative of (all) of the unique predefined characteristics of the first feature included in devices 502. For example, the electronic apparatus may select devices 504, 506, 510 to form set 530, and thus include representative devices having the respective first, second, and third predefined characteristics in the distinct sample set. In some embodiments, the electronic apparatus may select representative devices from one or more of groups 522 to form set 530, depending on the criteria used for selecting them.

Assignment, classification, and/or identification of the devices into groups 522 and/or selecting devices from groups 522 to form set 530, may in effect be performed by one or more analogous operations. For example, the electronic apparatus may serially analyze devices 502 (or an inventory thereof, such as a database including a list of features for each device and predefined characteristics for the features), and select representative devices from the list that have unique identified predefined characteristics compared to the other selected devices to form set 530.

For example, prior to analyzing the inventory, set 530 may be empty. The electronic apparatus may access the inventory of devices 502 in which devices 502 are listed in an order. For instance, the order may correspond to the reference numbers of devices 502 in FIG. 5, with device 504 being listed first in the order, device 506 being listed second in the order, device 508 being listed third in the order, and so on. The electronic apparatus may first analyze information in the inventory for device 504, determine that device 504 has the first predefined characteristic, determine that no other devices in set 530, which has no devices at this point, have the first predefined characteristic, and add device 504 to set 530. Device 504 thus is representative of a group, indicated in FIG. 5 as group 524, having the features and characteristics that device 504 has. Device 504 may end up being the only device in the group or there may be others.

In general, the first analyzed device, in this case device 504, will be added to set 530 because no devices have yet been added to set 530, and thus any identified predefined characteristic would be a newly identified predefined characteristic.

The electronic apparatus may then analyze information in the inventory for device 506, determine that device 506 has a second predefined characteristic, determine that the second predefined characteristic is a newly identified predefined characteristic (e.g., because the electronic apparatus has to this point only previously identified the first predefined characteristic in the analysis of devices 502 for the requested revision), and add device 506 to set 530 as a representative of a second group 526 of devices having the second predefined characteristic.

The electronic apparatus may then analyze information in the inventory for device 508, determine that device 508 has the first predefined characteristic, determine that the first predefined characteristic is not a newly identified predefined characteristic (but rather has been previously identified when information for device 504 was analyzed), and not add device 508 to set 530 (e.g., by ignoring device 508). Identifying that the first predefined characteristic is not a newly identified predefined characteristic is in effect a classification of device 508 into a group (group 524 in this example) represented by a device that has already been selected for set 530. This process may be continued for all of the devices being considered for the revision, which may include all of the devices on the network or just one or more selected types of devices on the network.

The electronic apparatus may determine whether the requested revision can be successfully performed (e.g., executed) on the devices in set 530. For example, the electronic apparatus may connect to device 504. The electronic apparatus may send an inquiry to device 504 to determine whether device 504 is capable of executing the requested revision. The electronic apparatus may receive a response to the inquiry from device 504. The response from device 504 may indicate whether device 504 is capable of executing the requested revision. Because device 504 may be representative of a predetermined criterion of group 524 (e.g., the computing feature having the first software version), the response from device 504 may, in effect, indicate whether the requested version can be successfully performed on the other network devices in group 524.

Similarly, the electronic apparatus may connect to device 506. The electronic apparatus may send an inquiry to device 506 to determine whether device 506 is capable of executing the requested revision. The electronic apparatus may receive a response to the inquiry from device 506. The response from device 506 may indicate whether device 506 is capable of executing the requested revision. Because device 506 may be representative of a predetermined criterion of group 526 (e.g., the computing feature having the second software version), the response from device 506 may, in effect, indicate whether the requested version can be successfully performed on the other network devices in group 526.

Similarly, the electronic apparatus may connect to device 510. The electronic apparatus may send an inquiry to device 510 to determine whether device 510 is capable of executing the requested revision. The electronic apparatus may receive a response to the inquiry from device 510. The response from device 510 may indicate whether device 310 is capable of executing the requested revision. Because device 510 may be representative of a predetermined criterion of group 528 (e.g., the computing feature having the third software version), the response from device 510 may, in effect, indicate whether the requested version can be successfully performed on the other network devices in group 528.

Prior to sending the inquiry to device 504, the electronic apparatus may format at least a first command of the inquiry in a format that may prevent device 504 from executing the at least first command upon receipt of the inquiry by device 504. The at least first command may correspond to a command that may be executable to perform the requested revision.

Prior to sending the inquiry to device 506, the electronic apparatus may format at least a first command of the inquiry in a format that may prevent device 506 from executing the at least first command upon receipt of the inquiry by device 506.

Prior to sending the inquiry to device 510, the electronic apparatus may format at least a first command of the inquiry in a format that may prevent device 510 from executing the at least first command upon receipt of the inquiry by device 510.

The at least first command of the inquiry sent to device 506 and the at least first command of the inquiry sent to device 510 may each correspond to the at least first command of the inquiry sent to device 504. For example, these commands may be the same commands.

The electronic apparatus may store a record 532 of whether the requested revision can be successfully performed on network devices in each of the plurality of groups 522. The record may be stored on an electronic storage device. The record may be based on whether it was determined that the requested revision can be successfully performed on the selected network device in each of the plurality of groups. For example, record 532 may include characteristic data 534 represented as images of the devices in this illustration, command data 536, and result data 538. Characteristic data 534 may correspond to and/or identify the predefined characteristic (or configuration) of devices in set 530. Command data 536 may correspond to and/or identify the inquiry and/or command(s) sent to one or more representative devices in set 530. Result data 538 may correspond to and/or identify a determination of whether or not the requested revision can be successfully performed on devices in set 530.

A result of "valid" in result data 538 may correspond to an indication that the command(s) identified in command data 536 may be successfully performed on a device having the predefined characteristic identified in the associated characteristic data 534. A result of "not valid" in result data 538 may correspond to an indication that the command identified in command data 536 may not be successfully performed (e.g., may not be recognizable or may produce an undesirable reconfiguration) on a device having the predefined characteristic identified in the associated characteristic data 534. As shown in FIG. 5, record 532 includes characteristic data 534, command data 536, and result data 538 for each device in set 530 with devices 504, 510 having a "valid" result, and device 506 having a "not valid" result.

To perform (e.g., execute) the requested revision, the electronic apparatus may determine to which group of the one or more groups 522 each of devices 502 belongs. For example, the electronic apparatus may determine and/or identify that devices 504, 508, 518 belong to group 524 (e.g., because these devices have the same predefined characteristic), that devices 506, 514, 516 belong to group 526, and that devices 510, 512, 520 belong to group 528. In some examples, a list of devices 502 includes an indication of the group each device was assigned to when groups 522 were identified.

The electronic apparatus may determine from stored record 532 whether the requested revision can be successfully performed (e.g., properly executed to affect the desired revision) on a particular group to which a particular network device belongs. For example, the electronic apparatus may determine from stored record 532 that the requested revision can be successfully performed on devices 504, 508, 518 belonging to group 524, and on devices 510, 512, 520 belonging to group 528, but not on devices 506, 514, 516 belonging to group 526 because record 532 indicates the requested revision is "valid" for devices 504, 510, and is "not valid" for device 506.

In some embodiments, the electronic apparatus may refrain from performing the requested revision on one or more particular network devices if record 532 indicates that the revision cannot be successfully performed on the group to which those one or more particular network devices belong. For example, the electronic apparatus may refrain from performing the requested revision on devices 506, 514, 516 belonging to group 526 because record 532 indicates that the requested revision is "not valid" for device 506.

Example 4

Figure 7A:
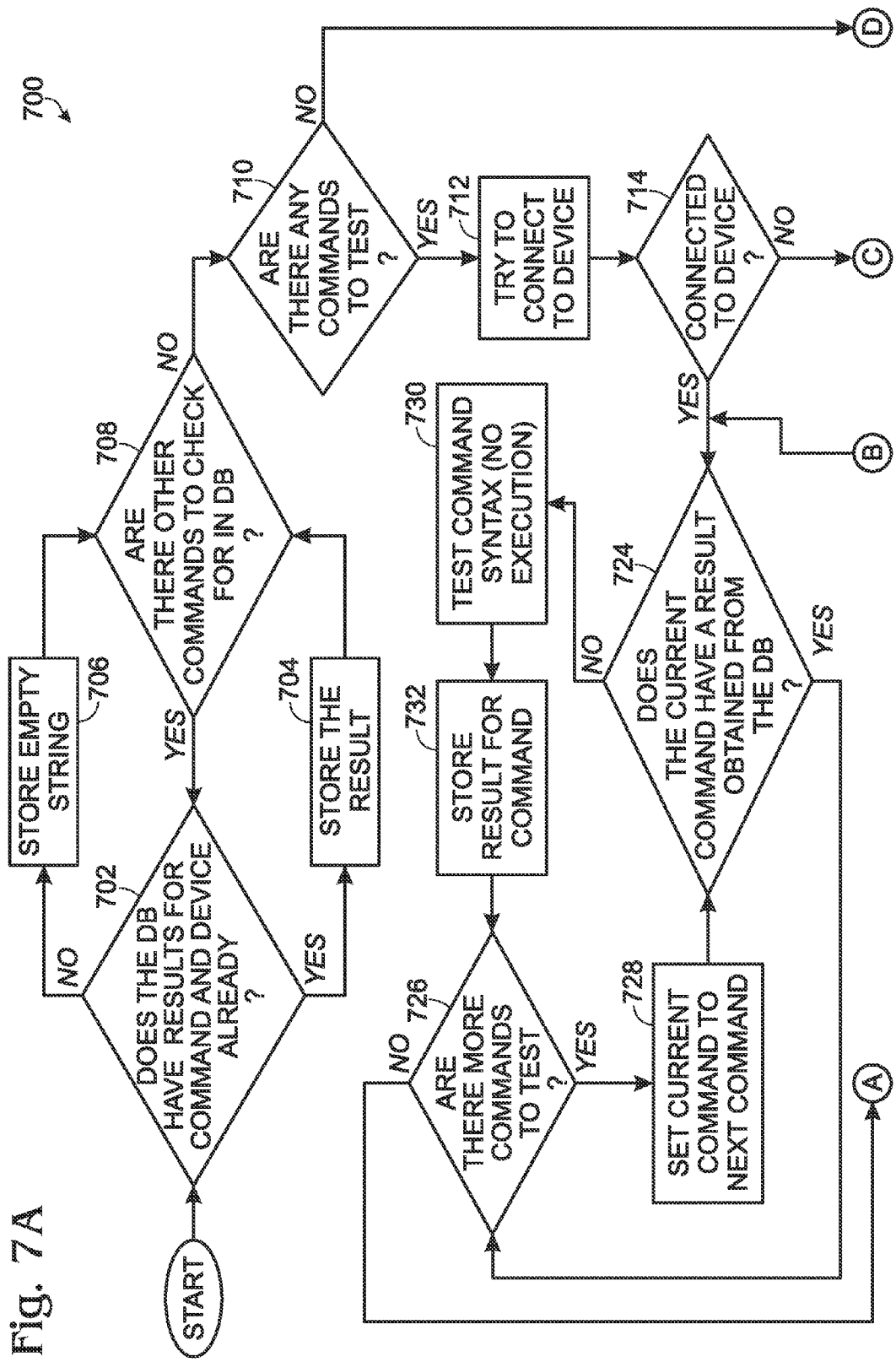
FIGS. 7A and 7B when viewed together are an illustration of operations performed by one embodiment.
Figure 7B:
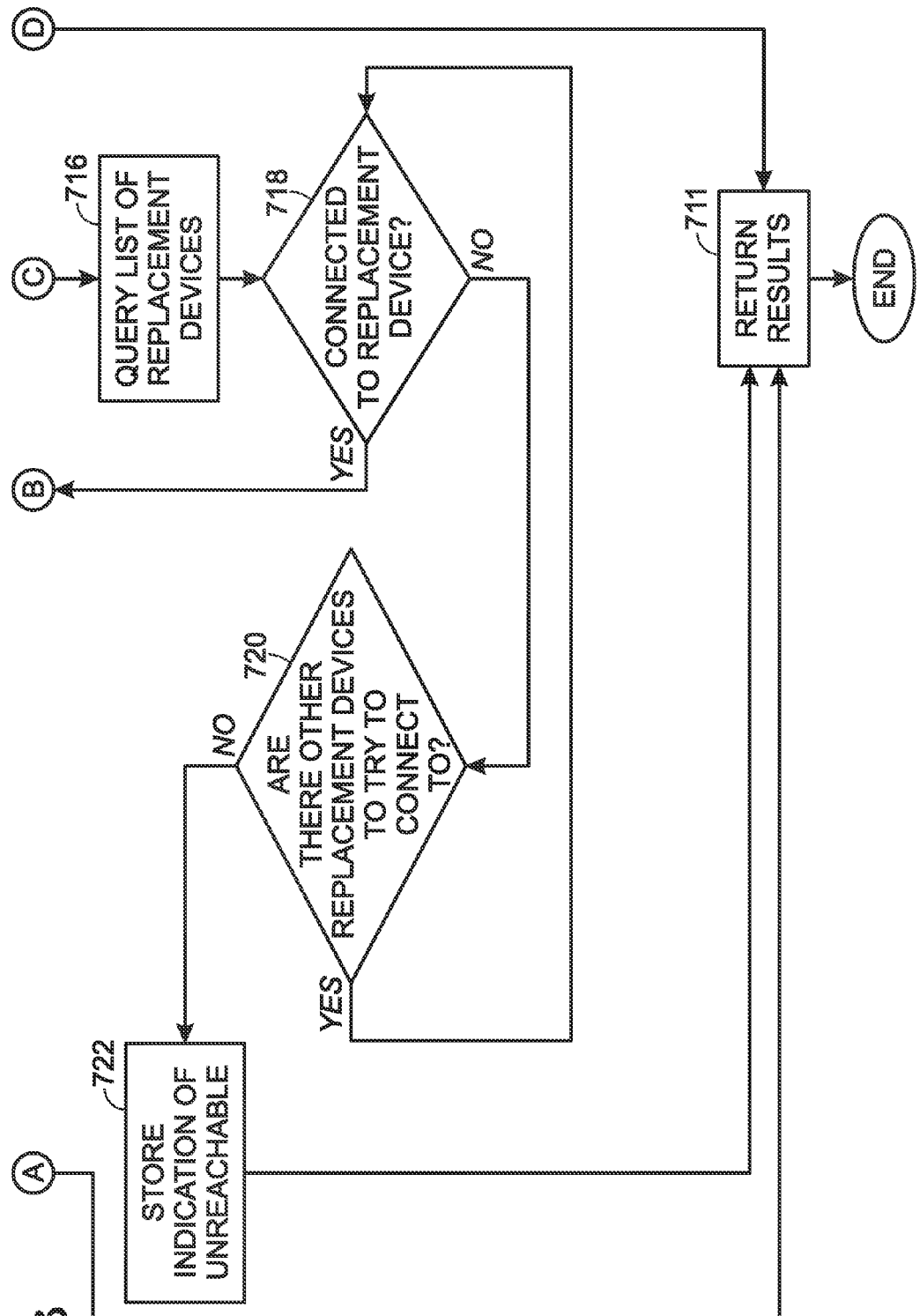

FIGS. 6 and 7 are flowcharts illustrating operations performed by one embodiment, and may not recite the complete process or all steps of the program. FIG. 6 depicts multiple steps of a method, generally indicated at 600, which may be performed in conjunction with any of the suitable examples disclosed herein. FIG. 7 depicts multiple steps of a subroutine, generally indicated at 700, which may be implemented in method 600. Although various steps of method 600 and subroutine 700 are described below and depicted in FIGS. 6 and 7, the steps need not necessarily all be performed, and in some cases may be performed in a different order than the order shown. In this example, network device revisions are described as being commands to change configurations of network devices. It will be appreciated that other forms of device revisions may be made. For example, a revision to operating code or other software on the device may be provided.

As shown in FIG. 6, method 600 may include a step 602 of receiving a valid input. The valid input may be received by an electronic apparatus, such as electronic apparatus 106 of FIG. 1. The valid input may be a request to perform a revision on plural network devices of a computer network to which the electronic apparatus has access. At least some of the plural network devices may have at least a first feature with plural predefined characteristics. The valid input may be received from (or via) a web form, or any other suitable data set input. The valid input may include a command set of one or more commands. The one or more commands may be executable commands, that when executed may make the desired revision.

Method 600 may include a step 604 of determining a distinct subset of devices based on criteria determined by features and predetermined characteristics of features of the network devices. The distinct subset of devices may include a subset of the plural network devices that are representative of the plural network devices having the first feature. The representative devices may have the first feature with unique predefined characteristics, with each representative device belonging to a respective group of devices all of which have the unique predefined characteristics. The distinct subset of devices may be determined in a manner similar to that used to determine sample set 530 (see FIG. 5).

Method 600 may include a step 606 of determining whether there is a device to test in the distinct subset of devices. If there are n devices in the distinct subset, then method 600 may perform a testing routine 607 n times (e.g., once for each device), where n may be an integer greater than or equal to 1. For example, step 606 may involve selecting (by the electronic apparatus) one of the devices in the distinct subset. When method 600 returns to step 606, the electronic apparatus may determine whether there is another device in the distinct subset that has not been tested, and may select that device for subsequent testing by testing routine 607. This process may continue until all of the devices in the distinct subset have been tested (or evaluated) by testing subroutine 607.

Testing routine 607 may include a step 608 of determining whether there is a spare resource available (e.g., a spare computing resource that the electronic apparatus may access or utilize). If a spare resource is not available, then method 600 may proceed to a step 610 of waiting for a predetermined duration of time (e.g., half of a second), and then return to step 608 to determine if a resource has become available. If it is determined at step 608 that a resource is available, then method 600 may proceed to a subroutine 612.

Subroutine 612 may determine whether the requested revision can be successfully performed on the selected one device. For example, subroutine 612 may include a step 614 of allocating (e.g., by the electronic apparatus) the spare resource to determine whether the requested revision can be successfully performed on the selected device. This determination process, explained in further detail with reference to the flow chart illustrated in FIG. 5, may involve identifying whether a previous "valid" result has already been determined and/or stored (e.g., in a previous test) for the particular command set on the particular feature having the particular predefined characteristic of the selected device. Alternatively and/or additionally, this determination process may involve sending the selected device an inquiry determining whether the selected device is capable of executing the revision, and receiving from the selected device a response to the inquiry indicating whether the selected device is capable of executing the revision.

Subroutine 612 may include a step 616 of storing results that were determined and/or identified in allocation step 614. For example, the electronic apparatus and/or the allocated resource may store on an electronic storage device a record of whether the requested revision can be successfully performed on devices represented by (and/or corresponding with) the selected device (e.g., having the same feature with the same predetermined characteristic). The record may be based on whether it was determined that the requested revision can be successfully performed on the selected device.

Testing routine 607 may include a step 618 of waiting for a predetermined duration of time (e.g., half of a second), after which method 600 may proceed to step 606 from testing routine 607. As described above, step 606 may once again determine whether there is a device in the distinct subset that needs to be tested (e.g., for which there are no results or no sufficient results).

If it is determined at step 606 that there are no remaining devices in the distinct subset to test (e.g., that there are sufficient results for all of the devices in the distinct subset), then method 600 may proceed to an output step. For example, method 600 may include a step 620 of outputting results determined in subroutine 612. For example, step 620 may include outputting the results to a screen (e.g., to a graphical user interface), and/or to a downloadable file (e.g., a .CSV file). Results output at step 620 may be used to successfully perform the revision on devices that are not in the distinct subset, but have the same feature with the same predetermined characteristic as at least one of the devices in the distinct subset which has a "valid" result. Accordingly, method 600, as well as other examples disclosed herein, may determine whether a revision may be successfully performed on a large number of devices without having to test each individual device.

FIG. 7 shows a subroutine 700, which may be a preferred embodiment of subroutine 612 of FIG. 6. As shown in FIG. 7, subroutine 700 may include a step 702 of determining whether a database (e.g., a previously stored record) already has a result for the selected device and a command in a revision that may include one command or a set of commands. For example, step 702 may involve the electronic apparatus (the allocated resource) checking for a result that may have been previously stored on the electronic storage device for the particular device configuration (e.g., the particular feature having the particular predefined characteristic) and the particular command.

If it is determined at step 702 that the database does already have a result for the command and selected device, then subroutine 700 may proceed to a step 704 of storing this result in the record (e.g., on the electronic storage device). If it is determined that the database does not already have a result for the selected device and the command, then subroutine 700 may proceed to a step 706 of storing an empty string (or other suitable marker) in the record.

Subroutine 700 may include a step 708 of determining whether there are other commands in the command set to check for in the database. As shown in FIG. 7, step 708 may follow both of steps 704 and 706. If it is determined at step 708 that there are other commands in the command set to check for in the database, then subroutine 700 may proceed back to step 702.

If it is determined at step 708 that there are no other commands in the command set to check for in the database (e.g., if step 702 has been performed for each command in the command set), then subroutine 700 may proceed to a step 710 of determining whether there are any commands to test. For example, step 710 may involve the electronic apparatus (the allocated resource) determining whether the database had (or has) all of the results for the one or more commands of the command set for the current network device revisions for the selected device from the distinct subset. For example, step 710 may involve the electronic apparatus determining whether any empty strings were stored in the record for the selected device at step 706. If it is determined at step 710 that there are no commands to test (e.g., that no empty strings have been stored for the selected device), then subroutine 700 may proceed to a step 711 of returning the results (e.g., which may be later output in method 600 at step 620—see FIG. 6).

If it is determined at step 710 that there are commands to test, then subroutine 700 may proceed to a step 712 of attempting to connect to the selected device. For example, step 712 may involve the electronic apparatus attempting to connect to the selected device.

Subroutine 700 may include a step 714 of determining whether the electronic apparatus is connected to the selected device (e.g., so as to enable transmission of data between the selected device and the electronic apparatus).

If it is determined at step 714 that the selected device has not been connected to (e.g., that the selected device is unavailable or offline), then subroutine 700 may proceed to a step 716 of querying a list of replacement devices. The replacement devices may be devices that have the same feature(s) with the same predefined characteristic as the selected device. For example, replacement devices for selected device 504 may include devices 508 and 518 (see FIG. 5).

Subroutine 700 may further include a step 718. Step 718 may include attempting to connect to one of the replacement devices. For example, step 718 may involve the electronic apparatus attempting to connect to one of the replacement devices listed in step 716.

Step 718 may include determining whether a replacement device has been connected to (e.g., by the electronic apparatus). If it is determined at step 718 that a replacement device has not been connected to, then subroutine 700 may proceed to a step 720 of determining whether there are other replacement devices (e.g., on the queried list) to attempt to connect to. If it is determined that there are no other replacement devices to attempt to connect to, then subroutine 700 may proceed to a step 722 of storing an indication in the record that the selected device and/or a replacement device are unreachable, and then proceed to step 711. However, if it is determined at step 720 that there are other replacement devices to try to connect to (e.g., other replacement devices on the queried list), then step 720 may return to step 718 and the electronic apparatus may attempt to connect to the other replacement device.

If it is determined at step 718 that a replacement device has been connected to and/or if it determined at step 714 that the selected device has been connected to, then subroutine 700 may proceed to a step 724 of determining whether a command (e.g., a current command) of the command set has a result obtained (or obtainable) from the database.

For example, a command set may include first, second, and third commands. Step 702 may have determined that the database already has a result for the first and second commands (in relation to the predefined characteristic of the selected device), but may have determined that the database did not already have a result for the third command (in relation the predefined characteristic of the selected device). Accordingly, step 704 may have stored the results for the first and second commands in the record, and step 706 may have stored an empty string for the third command. Thus, at step 724 it may be determined that the first command does have a result obtained (or obtainable) from the database (or the record), and subroutine 700 may proceed to a step 726 of determining whether there are more commands to test. For example, at step 726 the electronic apparatus and/or the allocated resource may determine if there are more commands in the command set (e.g., other than the commands that have already been considered at step 724). For example, step 726 may determine that there is a second command in the command set to test.

If there are more commands in the command set to test, then subroutine 700 may proceed to a step 728 of setting the current command (e.g., the command upon which step 724 makes a determination) to the next command. For example, step 728 may set the command to be considered by step 724 to the second command. At step 724, the electronic apparatus and/or the allocated resource may determine that the second command does have a result obtainable from the database (and/or the record). Subroutine 700 may then proceed to step 726 where it may be determined that the command set does include a third command. Subroutine 700 may then proceed to step 728 where the third command may be set to the current command for consideration by step 724. Step 724 may determine that the third command does not have a result obtained (or obtainable) from the database (or the record).

If it is determined at step 724 that the current command does not have a result obtained (or obtainable) from the database (or the record), then subroutine 700 may proceed to a step 730 of testing command syntax of the current command. For example, the electronic apparatus (e.g., the allocated resource which may be included in the electronic apparatus) may send the selected device (or a replacement device corresponding to the selected device) a first inquiry determining whether the selected network device is capable of executing the revision, or a portion thereof, such as the third command. The first inquiry may not require the revision to be performed on the selected device. For example, prior to sending the selected device (or the replacement device) the first inquiry, the electronic apparatus may format the current command in a format that may prevent the selected device (or the replacement device) from executing the current command upon receipt of the first inquiry.

For example, at step 724 the first inquiry may be formatted to include the current command followed by a space and a question mark (e.g., "show clock ?"). If the current command has a valid result for the selected device (e.g., is executable on the selected device), then the selected device (or the replacement device) may return a response to the electronic apparatus indicating that the current command is successfully executable and/or recognizable by the selected device. For example, at step 730 the electronic apparatus may receive a response of "<cr>" from the selected device (or the replacement device) if the current command is successfully executable. However, if the selected device (or the replacement device) does not recognize the current command, then the selected device (or the replacement device) may return a response of "Unrecognized" to the electronic apparatus at step 730. If the selected device (or the replacement device) returns neither "<cr>" nor "Unrecognized," then the current command may be incomplete.

In some embodiments, step 730 may involve sending a second inquiry including the current command to the selected device (or the replacement device). For example, if the selected device (or the replacement device) does not return either "<cr>" or "Unrecognized," then step 730 may involve formatting the second inquiry in a second format that may not require (or may prevent) the selected device (or the replacement device) from executing the current command upon receipt of the second inquiry.

The second inquiry may be formatted to assist in determining whether the current command is incomplete. For example, the second inquiry may be formatted to include the current command followed by "include cr ?" (e.g., "show clock|include cr ?"). If the current command has a valid result, then the selected device (or the replacement device) may return a response including "<cr>" at step 730. If the current command is incomplete, then the selected device (or replacement device) may return a response of "Incomplete" at step 730. If the selected device (or the replacement device) does not return either "<cr>" or "Incomplete" (e.g., if the selected device or the replacement device does not respond at all), then an error may have occurred and an indication of such an error may be stored in the record (e.g., a result of "problem" may be stored in the record for the current command).

Subroutine 700 may include a step 732 of storing a result for the current command. For example, if the selected device (or the replacement device) returns a result of "<cr>" for the current command in response to the first inquiry, then the electronic apparatus may store a result of "valid" in the record for the current command and the selected device. However, if the selected device (or the replacement device) returns a result of "Unrecognizable" in response to the first inquiry, or a result of "Incomplete" in response to the second inquiry, then the electronic apparatus may store a result of "not valid" for the current command and the selected device in the record on the electronic storage device. Step 732 may then be followed by step 726.

If it is determined at step 726 that there are no more (or additional) commands in the command set to test (e.g., if it is determined that all of the commands of the command set have a result obtained or obtainable from the database and/or the record), then subroutine 700 may proceed to step 711 and return the results corresponding with the selected device to method 600 for subsequent output.

Results output by method 600 (see FIG. 6) may be used to efficiently determine whether a revision can be executed on a large number of devices with low risk of undesirable reconfigurations. For example, HP Network Automation software, available from Hewlett-Packard Development Company, may be particularly useful for managing access to various network devices and applying the requested revision to devices in groups having valid results. An example of such a software program is described in U.S. Pat. No. 7,925,666, which patent is hereby incorporated by reference.

Example 5

FIG. 8 is a flowchart illustrating operations performed by one embodiment as described above, and may not recite the complete process or all steps of the program. FIG. 8 depicts multiple steps of a method, generally indicated at 800, which may be performed in conjunction with any of the suitable examples, or portions thereof, disclosed herein according to aspects of the present disclosure. Although various steps of method 800 are described below and depicted in FIG. 8, the steps need not necessarily all be performed, and in some cases may be performed in a different order than the order shown.

Method 800 may include a step 802 of receiving a revision request including at least one executable command. For example, the revision request may be received by an electronic apparatus, such as electronic apparatus 106.

Method 800 may include a step 804 of classifying (by the electronic apparatus) network devices into one or more groups. The electronic apparatus may have access to the network devices. At least some of the network devices may have a first feature with plural predefined characteristics. The first feature and/or the predefined characteristics may be related to the revision request. The network devices may be classified according to a uniqueness of their respective predefined characteristics.

Method 800 may include a step 806 of determining whether the requested revision can be successfully performed on the one or more groups. For example, step 806 may involve selecting, by the electronic apparatus, at least one network device from each of the one or more groups. The electronic apparatus may check to see if a database (or previous record) already has results corresponding to a determination of whether the at least one command of the requested revision can be successfully performed on the selected device, and/or may test the command syntax to produce a result for any command that does not already have obtainable results, for example, in a manner similar to method 600 and/or subroutine 700 (see FIGS. 6 and 7). For example, the electronic apparatus may store any previously obtained and/or newly produced results in a record on an electronic storage device.

Method 800 may include a step 808 of executing the at least one command on network devices within a group having valid results. For example, the results output at step 620 of method 600 (see FIG. 6) may be used to execute the at least one command on network devices for which the at least one command will successfully perform the requested revision. For example, for each network device having the first feature, the electronic apparatus may determine which group of the plurality of groups the network device belongs to. The electronic apparatus may determine from the stored record whether the revision can be successfully performed on the group the network device belongs to. For example, the electronic apparatus may determine from the stored record whether the at least one command can be successfully executed (e.g., has a valid result) on the selected device (or a replacement device) from the group that the network device belongs to. For each network device classified, the electronic apparatus (or an allocated resource) may perform the revision on the network device if the record indicates that the revision can be successfully performed on the group that the network device belongs to.

Manner of Operation/Use

In an embodiment, a network architecture group may send a requested network revision to a group of network designers. The network designers may receive the requested network revision as a set of one or more commands, which the architecture group believes will effect a desired network revision when executed on the network devices. For example, the revision may involve a first software update or device reconfiguration. The network designers may input the requested network revision into an electronic apparatus. The electronic apparatus may communicate with a set of network devices over a network. The electronic apparatus may classify each device in the set of devices into one or more groups. The classification may be based upon predefined characteristics (or criteria) of the devices, and how (or if) these predefined characteristics relate to the requested network revision.

For each group, the electronic apparatus may check a stored record and/or perform a test on a selected device from the group to determine whether the requested revision can be successfully performed on devices in the group. The test may be formatted to prevent execution of command syntax corresponding to the requested revision. The test may determine whether the command syntax would produce a valid result if actually executed without requiring execution. If the electronic apparatus determines that the requested revision can be successfully performed on devices in the group (e.g., by checking the record and/or testing just one device in the group), then the requested revision may be applied to the group knowing in advance of execution that it will be successful. However, if the electronic apparatus determines that the requested revision cannot be successfully performed on devices in the group (e.g., by checking the record and/or testing just one device in the group), then the requested revision may not be applied to the group, but rather the requested network revision may be changed to effect the desired network revision on that particular group.

For example, the electronic apparatus may determine that a first software update may be successfully applied to (e.g., performed on) a first group of network devices, but not to a second group of network devices. The first software update may be applied to the first group of network devices (e.g., on each of the network devices in the first group), and a second software update that is unique from the first software update may be applied to the second group of network devices. For example, results from the stored record and/or testing may assist the architecture group and/or network designers in authoring the second software update so that it can successfully perform the desired network revision on the second group of network devices.

Results of whether a particular requested revision (or command subset thereof) was successful for a particular group may be stored (or cached) for future use, such that when the system has determined that a particular revision can be successfully performed on a particular group, no analysis is required on additional devices that can be classified into that group.

Advantages, Features, Benefits

The different embodiments of the systems and methods described herein provide several advantages over known solutions for processing a requested network revision. For example, the illustrative embodiments of the systems and methods described herein allow for grouping (or classifying) network devices. By grouping the network devices, analyzing a selected device from each group that is representative of that group, and storing analysis results, time required for device analysis may be greatly reduced. Additionally, and among other benefits, illustrative embodiments of the systems and methods described herein allow for determining whether a particular requested revision will be successful for a large number of devices without requiring execution of command syntax that attempts to actually perform the revision, thus reducing a likelihood of an undesirable (e.g., unauthorized, unplanned, or unsuccessful) reconfiguration. The illustrative embodiments described herein are particularly useful for large computer (or data processing) networks, although it may also be used on small and medium sized networks. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and sub-combinations of the various elements, features, functions, and/or properties disclosed herein. The following claims particularly point out certain combinations and sub-combinations regarded as novel and nonobvious. Inventions embodied in other combinations and sub-combinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:
1. A method comprising:
receiving a request by an electronic apparatus to perform a revision on plural network devices of a computer network to which the electronic apparatus has access, at least some of the plural network devices having at least a first feature with plural predefined characteristics;
identifying by the electronic apparatus at least a first group of the plural network devices according to a first predetermined criterion including that the first feature of each network device in the first group of network devices has a first predefined characteristic of the plural predefined characteristics;
selecting by the electronic apparatus a first network device of the network devices in the first group of the plural network devices;
sending, from the electronic apparatus to the first network device, a non-executable inquiry including at least a first command, formatted in a format that prevents the first network device from executing the first command upon receipt of the inquiry, the inquiry causing the first network device to produce a valid response if the network device is capable of executing the revision and an invalid response if the network device is not capable of executing the revision;
based on whether the response from the first network device is valid or invalid, storing on an electronic storage device a record of whether the revision can be successfully performed on the network devices in the first group of the plural network devices; and performing the revision on each device in the first group of the plural network devices if the response to the inquiry indicates that the revision can be successfully performed on the first network device.

2. The method of claim 1, further comprising:

identifying at least a second group of the plural network devices on the network having the first feature with a second predefined characteristic related to the revision, the second predefined characteristic being different than the first predefined characteristic;

selecting by the electronic apparatus a second network device of the network devices in the second group of the plural network devices;

sending, from the electronic apparatus to the second network device, a non-executable inquiry including at least a second command, formatted in a format that prevents the second network device from executing the second command upon receipt of the inquiry including at least the second command, the inquiry including at least the second command causing the second network device to produce a valid response if the network device is capable of executing the revision and an invalid response if the network device is not capable of executing the revision;

based on whether the response from the second network device is valid or invalid, storing on the electronic storage device a record of whether the revision can be successfully performed on network devices in the second group of the plural network devices; and performing the revision on each device in the second group of the plural network devices if the response to the inquiry indicates that the revision can be successfully performed on the second network device.

3. The method of claim 1, further comprising:

assigning each network device of the plural network devices into one of a plurality of groups of the plural network devices including the first group of the plural network devices, the plural network devices having plural features including the first feature, with each of the plural features having plural predefined characteristics among the plural network devices including the first predefined characteristic, with each group of the plural network devices satisfying a respective predetermined criterion including a unique combination of the predefined characteristics of the plural features;

selecting by the electronic apparatus a respective representative network device from each of the groups of the plural network devices;

sending, from the electronic apparatus to each of the representative network devices, a non-executable inquiry including at least a respective command including the first command for the first group of the plural network devices, the respective command being formatted in a format that prevents each respective representative network device from executing the respective command upon receipt of the inquiry including at least the respective command, the inquiry including at least the respective command causing each representative network device to produce a valid response if the network device is capable of executing the revision and an invalid response if the network device is not capable of executing the revision;

based on whether the response from each representative network device is valid or invalid, storing on the electronic storage device a record of whether the revision can be successfully performed on network devices in each of the plurality of groups of the plural network devices; and performing the revision on each device in each group of the plural network devices for which the response from the corresponding representative network device indicates that the revision can be successfully performed.

4. The method of claim 1, wherein, for a selected network device in the first group of the plural network devices, performing the revision includes:

determining from the stored record whether the revision can be successfully performed on the first group of the plural network devices; and performing the revision on the selected network device if the record indicates the revision can be successfully performed on the first group of the plural network devices.

5. The method of claim 4, further comprising refraining from performing the revision on the selected network device if the record indicates the revision cannot be successfully performed on the first group of the plural network devices.

6. A computer system, comprising:

a processor;

a storage device; and a program comprising a plurality of instructions stored in the storage device that are executed by the processor to:

receive a request to perform a revision on plural network devices of a computer network to which the computer system has access, at least some of the plural network devices having at least a first feature with different predefined characteristics;

identify at least a first group of the plural network devices having the first feature with a first predefined characteristic;

select a first network device of the network devices in the first group of the plural network devices;

send to the first network device a non-executable inquiry including at least a first command, formatted in a format that prevents the first network device from executing the first command upon receipt of the inquiry, the inquiry causing the first network device to produce a valid response if the network device is capable of executing the revision and an invalid response if the network device is not capable of executing the revision;

based on whether the response from the first network device is valid or invalid, store on an electronic storage device a record of whether the revision can be successfully performed on network devices in the first group of the plural network devices; and perform the revision on each device in the first group of the plural network devices if the response to the inquiry indicates that the revision can be successfully performed on the first network device.

7. The computer system of claim 6, wherein the plurality of instructions further comprises instructions that are executed by the processor to:

assign each network device of the plural network devices into one of a plurality of groups of the plural network devices including the first group of the plural network devices, the plural network devices having plural features including the first feature, with each of the plural features having plural predefined characteristics among the plural network devices including the first predefined characteristic, with each group of the plural network devices satisfying a respective predetermined criterion including a unique combination of the predefined characteristics of the plural features;
select a respective representative network device from each of the groups of the plural network devices;
send to each of the representative network devices a non-executable inquiry including at least a respective command including the first command for the first group of the plural network devices, the respective command being formatted in a format that prevents each respective representative network device from executing the respective command upon receipt of the inquiry including at least the respective command, the inquiry including at least the respective command causing each representative network device to produce a valid response if the network device is capable of executing the revision and an invalid response if the network device is not capable of executing the revision;
based on whether the response from each representative network device is valid or invalid, store on an electronic storage device a record of whether the revision can be successfully performed on network devices in each of the plurality of groups of the plural network devices; and
perform the revision on each device in each group of the plural network devices for which the response from the corresponding representative network device indicates that the revision can be successfully performed.

8. The computer system of claim 6, wherein the plurality of instructions further comprises instructions that are executed by the processor to:
for a selected network device in the first group of the plural network devices, determine from the stored record whether the revision can be successfully performed on the first group of the plural network devices; and
perform the revision on the selected network device if the record indicates the revision can be successfully performed on the first group of the plural network devices.

9. At least one non-transitory computer readable storage medium comprising computer readable program instructions embodied therewith, the computer readable program instructions, when read by a processor, configuring the processor to:
receive a request to perform a revision on plural network devices of a computer network to which the processor has access, at least some of the plural network devices having at least a first feature with different predefined characteristics;
identify at least a first group of the plural network devices having the first feature with a first predefined characteristic;
select a first network device of the network devices in the first group of the plural network devices;
send to the first network device a non-executable inquiry including at least a first command formatted in a format that prevents the first network device from executing the first command upon receipt of the inquiry, the inquiry causing the first network device to produce a valid response if the network device is capable of executing the revision and an invalid response if the network device is not capable of executing the revision;
based on whether the response from the first network device is valid or invalid, store on an electronic storage device a record of whether the revision can be successfully performed on network devices in the first group of the plural network devices; and
perform the revision on each device in the first group of the plural network devices if the response to the inquiry indicates that the revision can be successfully performed on the first network device.

10. The at least one non-transitory computer readable storage medium of claim 9, wherein the computer readable program instructions, when read by the processor, further configure the processor to:
assign each network device of the plural network devices into one of a plurality of groups of the plural network devices including the first group of the plural network devices, the plural network devices having plural features including the first feature, with each of the plural features having plural predefined characteristics among the plural network devices including the first predefined characteristic, with each group of the plural network devices satisfying a respective predetermined criterion including a unique combination of the predefined characteristics of the plural features;
select a respective representative network device from each of the plurality of groups of the plural network devices;
send to each of the representative network devices a non-executable inquiry including at least a respective command including the first command for the first group of the plural network devices, the respective command being formatted in a format that prevents each respective representative network device from executing the respective command upon receipt of the inquiry including at least the respective command, the inquiry including at least the respective command causing each representative network device to produce a valid response if the network device is capable of executing the revision and an invalid response if the network device is not capable of executing the revision;
based on whether the response from each representative network device is valid or invalid, store on an electronic storage device a record of whether the revision can be successfully performed on network devices in each of the plurality of groups of the plural network devices; and
perform the revision on each device in each group of the plural network devices for which the response from the corresponding representative network device indicates that the revision can be successfully performed.

* * * * *